Figure 1:
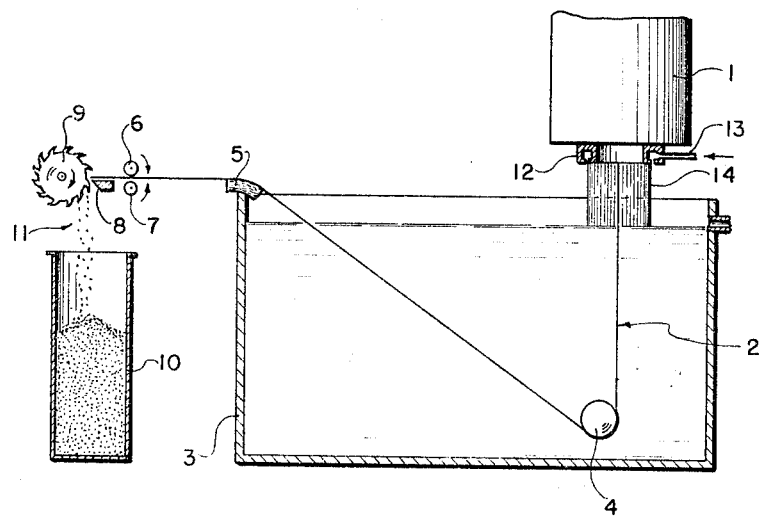

Sept. 6, 1966 C. VAN DEN BERGE 3,271,493
MELT SPINNING PROCESS
Filed Dec. 27, 1962

INVENTOR.
CORNELIS VAN DEN BERGE
BY
Francis W. Young
ATTORNEY 3,271,493
MELT SPINNING PROCESS
Cornelis van den Berge, Emmen, Netherlands, assignor to American Enka Corporation, Enka, N.C., a corporation of Delaware
Filed Dec. 27, 1962, Ser. No. 247,755
Claims priority, application Netherlands, Jan. 8, 1962, 273,302
5 Claims. (Cl. 264—143)

This invention relates in general to a process for melt spinning threads or filaments formed from thermoplastic material and more particularly to a melt spinning system utilizing a cooling tank disposed immediately beneath an extruder head and separated therefrom by an insulating zone of a gaseous medium.

The system to which this invention pertains is commonly used in the production of chips or granular material from enlarged filaments generally referred to in the trade as spaghetti, although other uses will become apparent hereinafter. In the production of chips a vertically disposed extruder head including a suitable filament forming die or spinneret is positioned very closely to but immediately above the upper surface of a liquid into which filaments enter almost immediately after discharge from the extruding apparatus. These filaments or spaghetti are chill-hardened during passage through the liquid medium and thereafter are fed to a cutting device for severing of the same into small granular particles. For purposes of the present invention, production of chips may include molding or spinning of linear thermoplastic polymers such as polyamides, polyesters, polyurethanes, and the like.

It has been found through past production of the material with which this invention is concerned that the extruder head should be separated from the liquid cooling medium by a heat insulating zone disposed intermediate the two areas. This separation zone has an obvious advantage in obviating excess cooling of the extruder head by the liquid medium which of course would waste considerable heat input to the melt extrusion apparatus. Another need for this zone arises during spinning-in or initial start-up of the equipment. Stray filaments of the material here under consideration float to the surface of the liquid if not completely controlled and could adhere to the extrusion head or spinneret surface unless precautions are taken. Separation of the extrusion head from the liquid surface of course prevents this undesirable occurrence. The same extruder head contaminations could occur during operation from yarn or filament breakage if the spinneret were in contact with the liquid surface.

It has been found that mere separation of the extruder head from the liquid surface does not completely obviate all objections concomitant with use of this type of equipment. Large amounts of monomers, oligomers, and/or other constituents are released from the extruded melt in gaseous form and may settle near or collect upon the spinneret or spinning plate. Prolonged uncontrolled collection of these monomers results in crust type formations in and around the spinneret orifices and eventually foul the same, thereby resulting in inferior production.

Further and apart from poor quality, monomers released from the filaments during extrusion are very harmful to the health of employees working in the immediate area. These monomers also sometimes attack the material from which the extrusion equipment is constructed or protective coats of paint applied thereto.

For reasons given hereinabove, it has been found that the heat insulation zone believed to be necessary between the extruder head and the surface of the cooling liquid should be isolated from surrounding equipment and the ambient atmosphere if at all possible. A somewhat uncomplicated means for providing the necessary isolation is found in the use of a tubular metallic sleeve similar to that shown, for example, in U.S. Patent No. 2,323,383. To perform the functions desired, this sleeve should completely surround the spinneret or extrusion head, thereby enclosing the freshly extruded spaghetti, and should extend below the surface of the liquid cooling medium, resulting in a complete seal of the spinning area.

Unfortunately, however, while an annular sleeve such as described overcomes some disadvantages resulting from production of this type, it has been found that monomer released from the freshly extruded filaments adheres to the wall of the sleeve and eventually contaminates the same beyond satisfactory use. Moreover, threading in of an extrusion apparatus employing this feature is extremely difficult, particularly since even the freshly extruded filaments will adhere to the sleeve wall and because sleeves of this type obstruct the spinning area. Complicated operator indoctrination is required before satisfactory performance can be expected. Also, some positive means must be provided to remove undesirable low-molecular by-products.

An object of the present invention is to provide an extrusion system not having the disadvantages enumerated hereinabove.

Another object of this invention is to provide a system for removing gaseous material released from freshly extruded filamentary products which does not encumber other operating features of the equipment associated therewith.

A further object of the present invention is to provide a heat insulation zone which is completely isolated from ambient atmosphere but which functions to remove monomers or other gaseous material released during spinning without employing pressure or suction equipment.

Another object of this invention is to provide a shield for isolating a heat insulation zone which permits unobstructed spinning-in of an extrusion apparatus such as described and to which freshly extruded filaments will not adhere.

Still a further object of this invention is to provide an isolating shield for a heat insulation zone between an extruding apparatus and a cooling tank which inherently absorbs and removes from the area any gaseous by-product of the extrusion operation.

These and other objects may be accomplished in accordance with the present invention by flowing a tubular stream of liquid from alongside the extrusion apparatus into the cooling liquid to seal an area of separation between extrusion and cooling, to absorb and remove undesirable gaseous products originating in said area, but to permit insertion of any equipment necessary for spinning in or maintenance of the spinning operation. Upon utilization of an annular stream of liquid, the freshly extruded filaments are completely surrounded and sealed from the time of spinning until submersion in the cooling liquid. Low molecular impurities produced during spinning are dissolved or entrained within the flowing shield and thereafter dissolved into the cooling liquid.

The annular stream of flowing liquid disclosed herein, which defines a zone in which any desirable insulating gas can be introduced, may extend from a fixed wall or flange on the extruder to another fixed wall completing the seal. To prevent formation of deposits on these walls, however, the temperature thereof must be maintained higher than that at which the low molecular products precipitate. To simplify construction and maintenance thereof, it is preferred that the liquid stream originate as closely to the extrusion head as possible and extend or flow directly into the cooling liquid without the utilization of metallic or solid wall surfaces on which monomer build-up could occur.

Although the composition of the liquid screen could be selected from a variety of materials compatible with the gaseous medium released during spinning, and although the heat insulation zone could be filled with a variety of gaseous materials, it has been found that a liquid stream formed from water operates very effectively and that a heat insulating medium such as air also performs effectively. It should be understood, however, that this invention is intended to cover any liquid flowing in an annular stream around the freshly extruded filaments and the use of any desired gaseous medium for insulating the area separating spinning from cooling.

This invention also relates to a process wherein an extrusion or molding device is modified to provide and utilize a flowing stream of liquid. A preferred apparatus affording liquid flow may include superimposed and concentric rings attached to the extruder head coaxially with the spinneret and forming therebetween an annular manifold having an annular opening or slot extending in the direction of spinning. The liquid shield may either gravitate or be pumped from the slot of the annular manifold, the important feature being that the liquid form a closed screen extending completely from the extrusion head to the level of liquid in the cooling trough.

Figure 2:
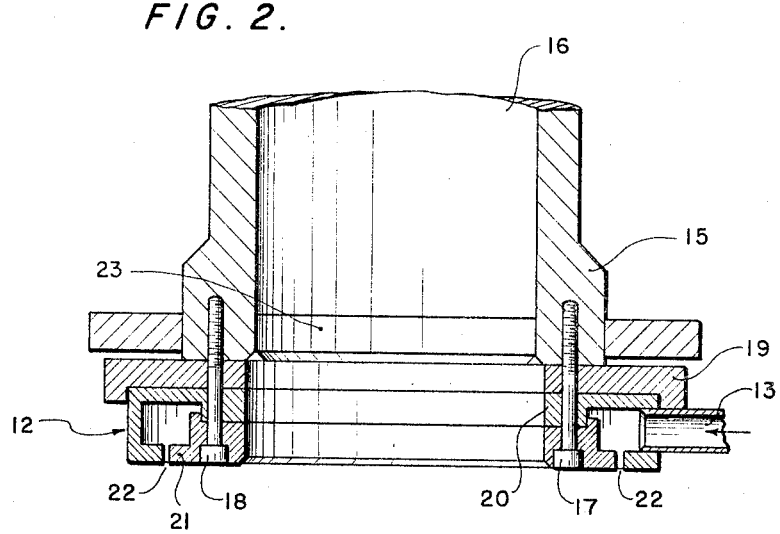

Other objects and advantages will become apparent upon study of the following detailed description taken in conjunction with the drawings, wherein FIGURE 1 is an elevational view in cross section illustrating a complete system for producing chips or granules from molten thermoplastic material; and FIGURE 2 is an enlarged view also in cross sectional elevation illustrating attachment of the liquid supply manifold to the extruder head.

Inasmuch as the extruder head 1 per se utilized with this invention is of conventional construction the same has been shown diagrammatically only in these figures. Suffice it to say that molten thermoplastic material of the type described earlier may be forced downwardly from extruder head 1 in the form of either filaments, spaghetti, or film 2. It will be assumed that spaghetti, or filaments of extraordinary thickness, have been extruded directly into the cooling liquid contained within tank 3.

In the normal operation of this type equipment, the filaments extend downwardly without engagement with any solid object until hardening occurs. Thereafter, filaments 2 are deflected about guide roller 4 and passed outwardly of the cooling liquid across a scraper or doctor blade 5, usually of sponge material. From the scraper 5, the filaments are withdrawn by counter-rotating feed rollers 6, 7 across stationary blade 8 and fed into the rotary chip cutter shown at 9. Chips or granular material 11 produced by the rotating cutter 9 are collected in a container 10 for storage and/or eventual remelting or respinning into funicular structures.

In lieu of solid shields normally utilized with the equipment shown in FIGURE 1, the present invention suggests the addition of an annular manifold 12 for storing and distributing liquid supplied through conduit 13 in the form of a screen 14 completely surrounding and sealing freshly extruded material from the ambient atmosphere. For further details, attention is directed to FIGURE 2.

The extruder head 1 terminates in a flanged portion or jacket 15 enclosing an area 16 within which is mounted a conventional pump block, filters, and distribution plates, none of which have been shown herein. Through the use of bolts 17, 18 or any other convenient means, a supporting disc 19 and the annular manifold 12 are attached to jacket 15. Should the same be desired, disc 19 may be formed from insulation material to avoid direct metallic contact between the manifold and extruder. Upper ring 20 and lower ring 21, which as shown together constitute the manifold 12, are separated one from the other by an annular space or slot 22 through which liquid supplied by conduit 13 may be discharged. The conduit may be soldered or attached to ring 20 in any other desired manner. As shown, these rings are coaxially mounted about a spinneret which is illustrated only by the block diagram 23.

Molten material contained within the area 16, and supplied either from an autoclave or a continuous polymerization vessel, is extruded through spinneret 23 in the form of filament 2 which traverses the insulation zone defined by liquid screen 14 prior to submersion in the cooling liquid contained within tank 3. Threading in of this equipment may be accomplished simply by forcing one's hand through the liquid wall to grasp the bundle of freshly extruded filaments. After passage of the bundle about guide roller 4 and through feed roller couple 6, 7, operation may continue without manipulation of any additional apparatus. It will be seen that liquid screen 14 provides a constant, although flexible, shield isolating the heat insulation zone from the spinning room and that this shield may be penetrated without resort to valves, levers, or the like. Further, the shield 14 continuously absorbs low molecular gaseous by-products emanating from the freshly extruded filaments and constantly removes these by-products through absorption and dissolution with the cooling liquid.

Inasmuch as many modifications will become apparent to those skilled in this art, it is intended that the present invention be limited to the extent set forth in the following claims.

What is claimed is:

1. A process for the manufacture of funicular structure comprising the steps of extruding a thermoplastic material through the atmosphere into a bath of cooling liquid, and flowing an annular stream of liquid about the freshly extruded funicular material to isolate the same from the ambient atmosphere extending between extrusion and the cooling liquid.

2. A process for manufacturing filamentary material comprising the steps of melt extruding a thermoplastic material downwardly into a bath of cooling liquid, and isolating the freshly extruded filaments from the ambient atmosphere by enclosing the same within an annular stream of flowing liquid extending from the point of extrusion to the cooling liquid to remove any low molecular by-products released during extrusion.

3. A process for manufacturing thermoplastic granules comprising the steps of extruding thermoplastic polymeric material vertically downwardly through a heat insulation zone into a bath of cooling liquid to solidify the same into filaments, said heat insulation zone extending from the point of extrusion to the bath of cooling liquid, flowing an annular stream of liquid about said freshly extruded material throughout said heat insulation zone to isolate the same from the ambient atmosphere, removing the solidified filaments from the bath of cooling liquid, and severing the same into discrete particles for further processing.

4. A process as set forth in claim 3 and comprising the additional step of providing a gaseous medium within said heat insulation zone to insure separation of the melt extrusion and filament solidification stages.

5. A process as set forth in claim 4 wherein said annular liquid stream is formed from water and said gaseous medium is formed from air.

References Cited by the Examiner

UNITED STATES PATENTS

| | | |
|---|---|---|
| 2,324,397 | 7/1943 | Hull. |
| 2,848,747 | 8/1958 | Dixon _____ 264—209 XR |
| 3,003,223 | 10/1961 | Breen _____ 264—171 XR |

FOREIGN PATENTS 560,153  9/1932  Germany.

ROBERT F. WHITE, *Primary Examiner.*

MORRIS LIEBMAN, *Examiner.*

C. B. HAMBURG, M. R. DOWLING,
*Assistant Examiners.*